F. W. TAYLOR, DEC'D.
E. W. CLARK, 3D, EXECUTOR.
PLANT GROWING APPARATUS.
APPLICATION FILED JULY 26, 1910.

1,171,558.

Patented Feb. 15, 1916.
9 SHEETS—SHEET 1.

WITNESSES

INVENTOR

ATTORNEY

Figure 2:
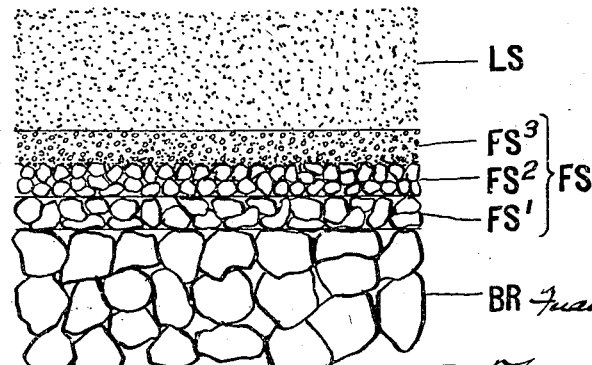

F. W. TAYLOR, DEC'D.
E. W. CLARK, 3D, EXECUTOR.
PLANT GROWING APPARATUS.
APPLICATION FILED JULY 26, 1910.
1,171,558.
Patented Feb. 15, 1916.
9 SHEETS—SHEET 2.
FIG. 2:A.
FIG. 3.
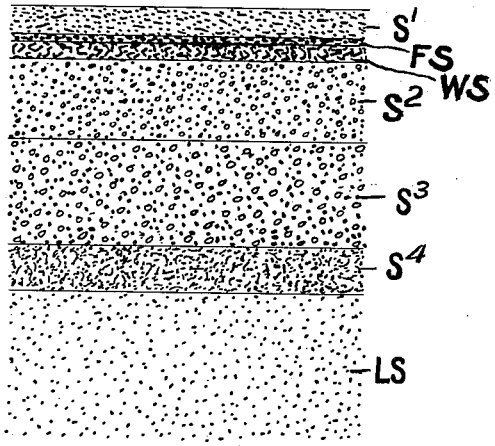
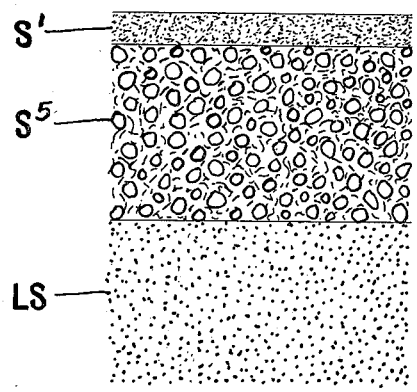
FIG. 4.
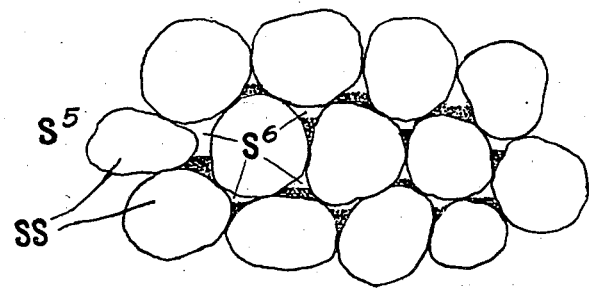
FIG. 5.
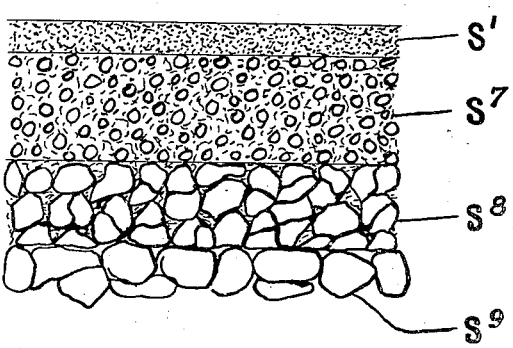
WITNESSES
Daniel Webster, Jr.
INVENTOR
Frederick W. Taylor
by Francis T. Chambers
his ATTORNEY F. W. TAYLOR, DEC'D.
E. W. CLARK, 3D, EXECUTOR.
PLANT GROWING APPARATUS.
APPLICATION FILED JULY 26, 1910.
1,171,558.
Patented Feb. 15, 1916.
9 SHEETS—SHEET 3.
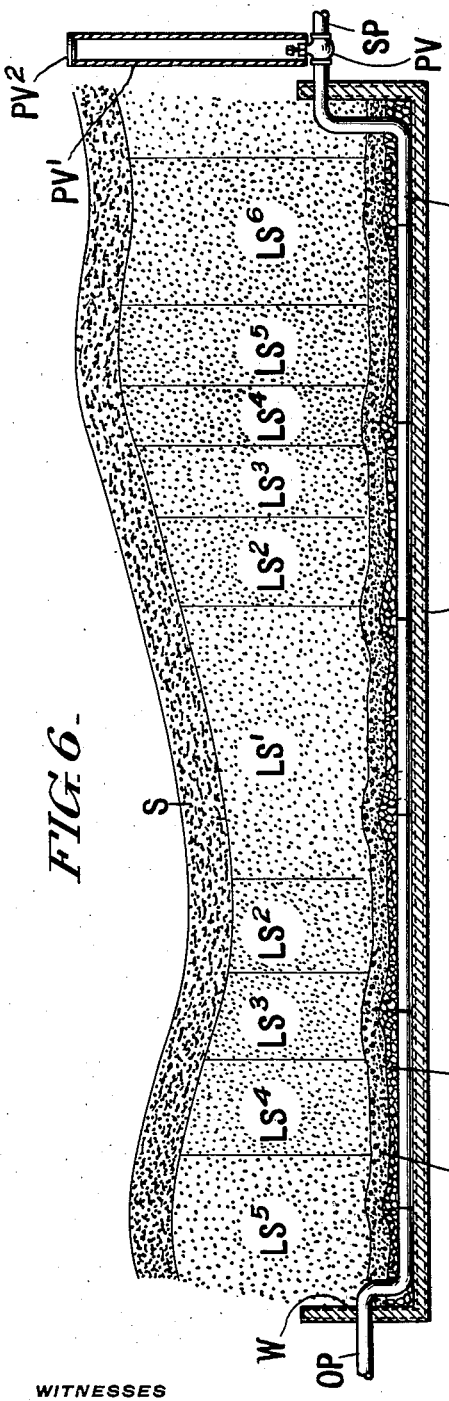
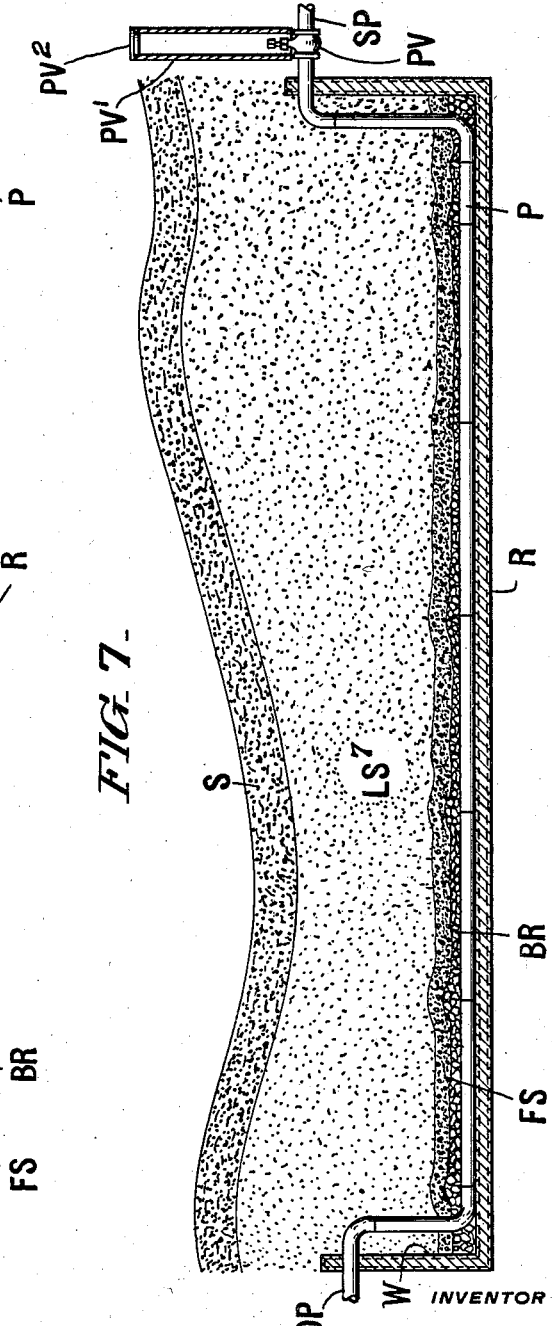

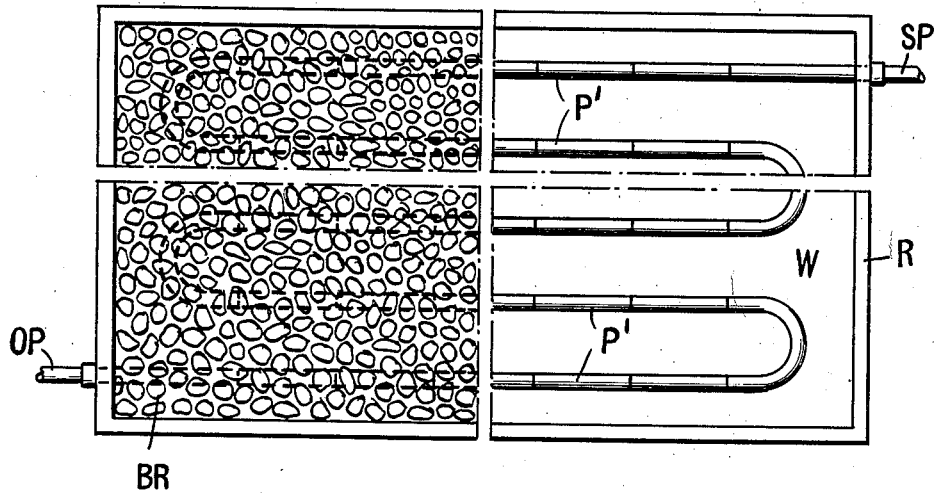
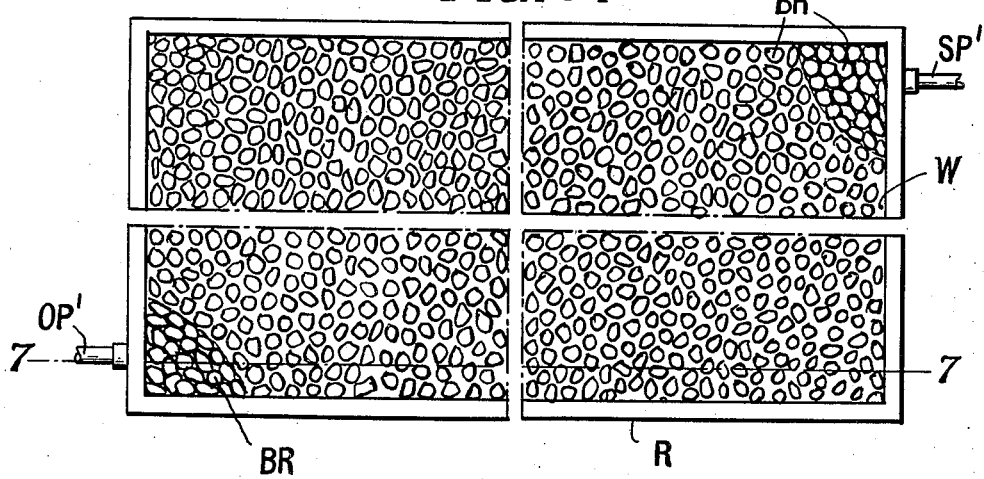
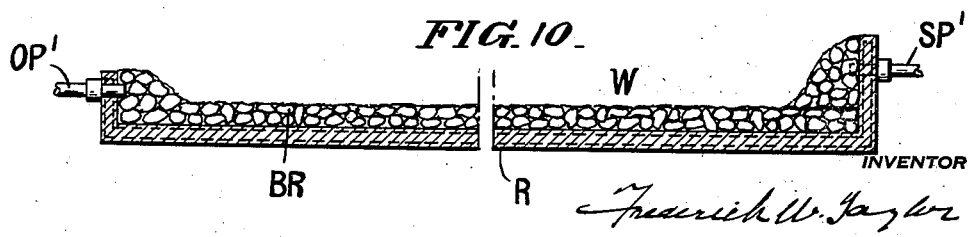

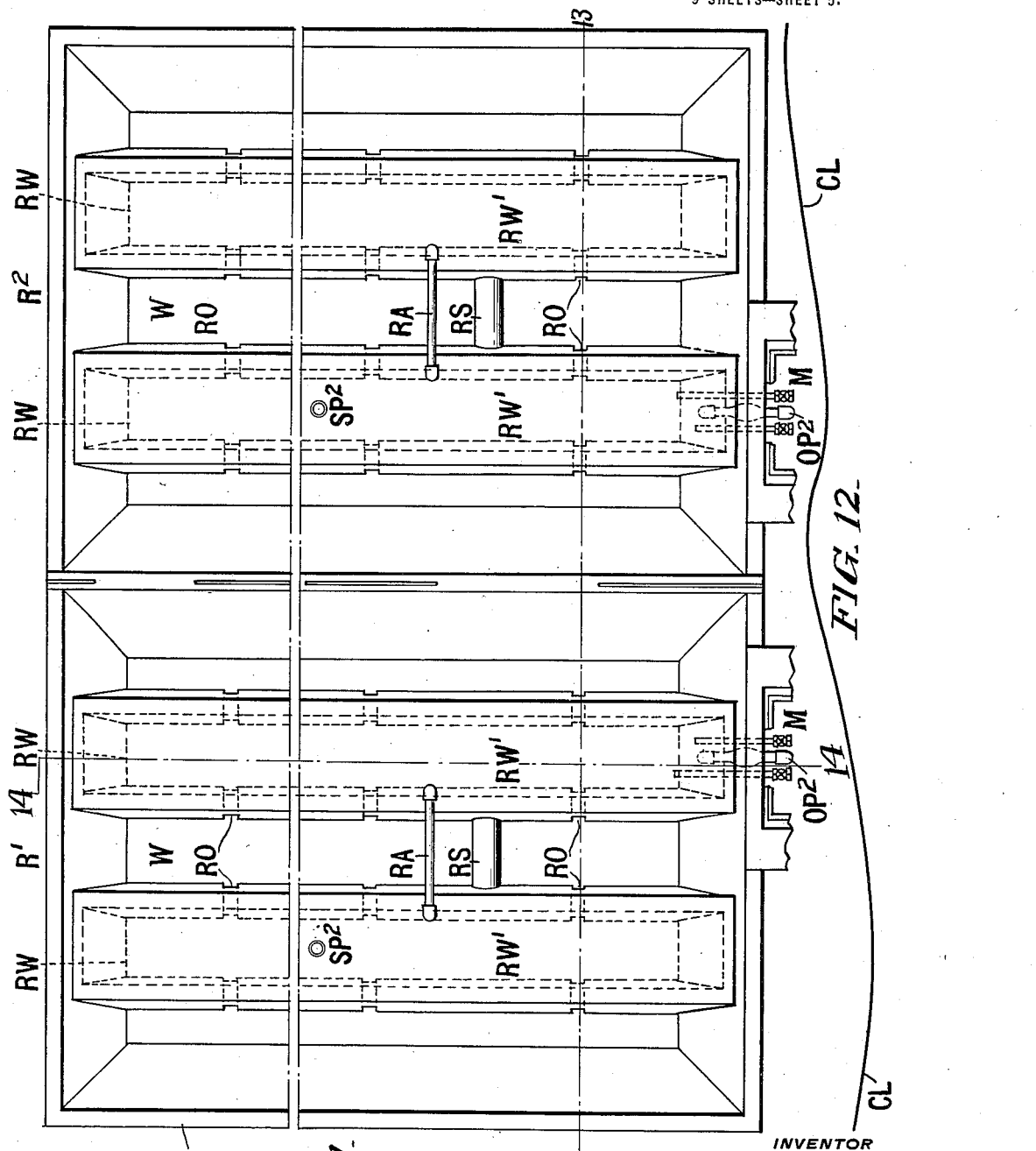

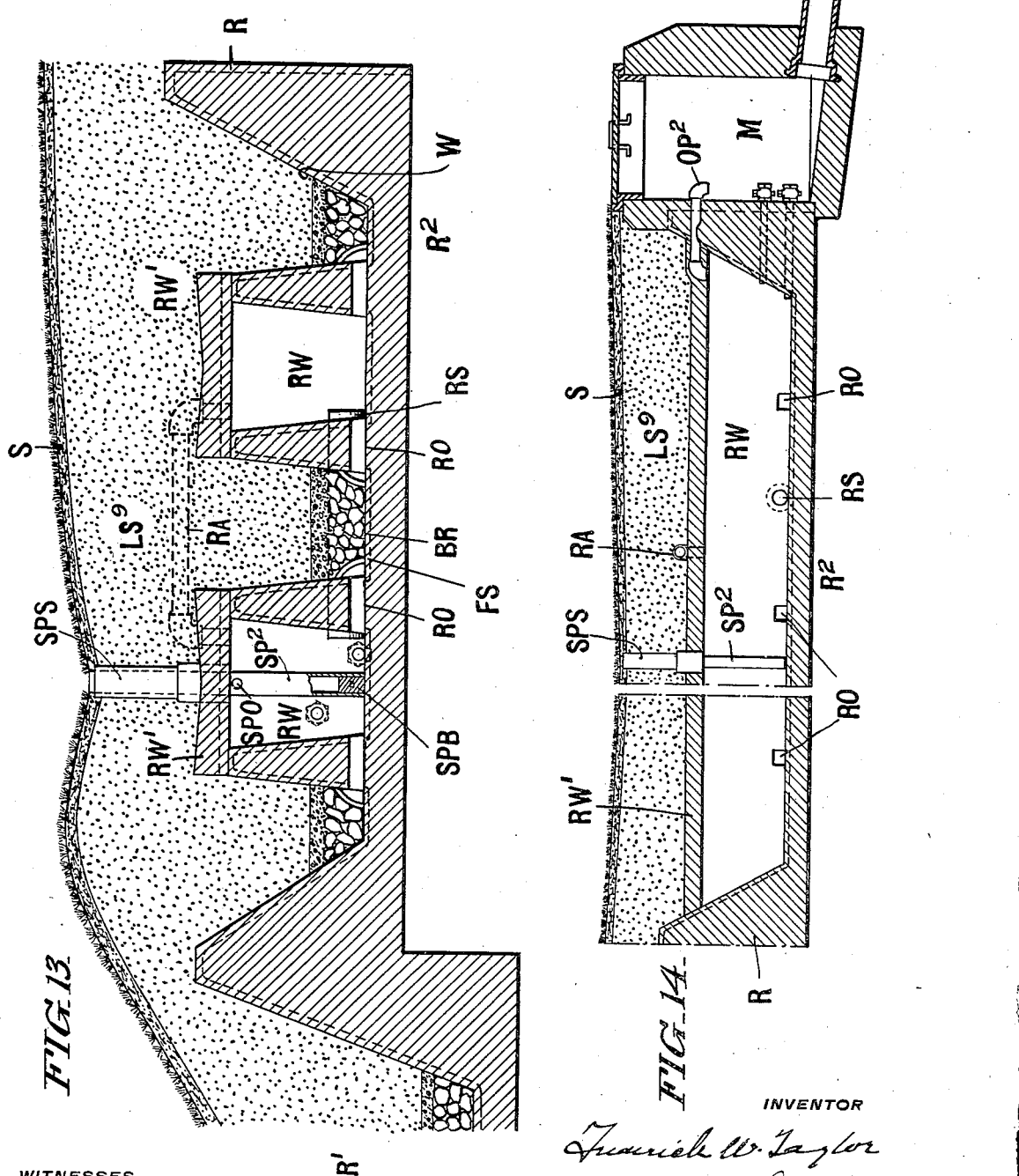

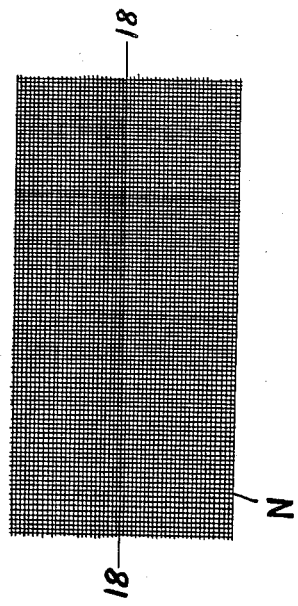
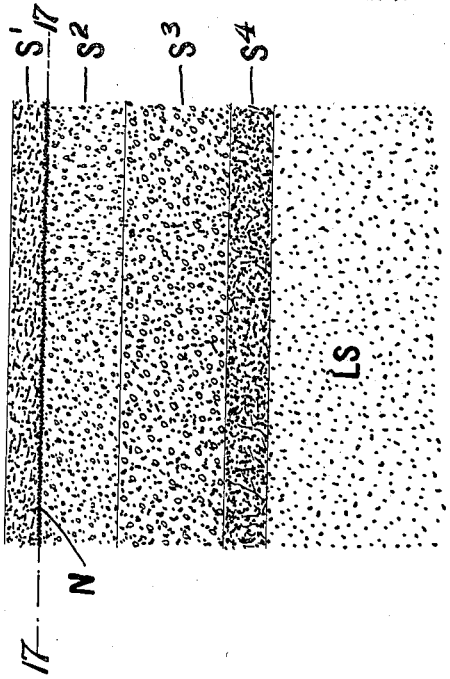
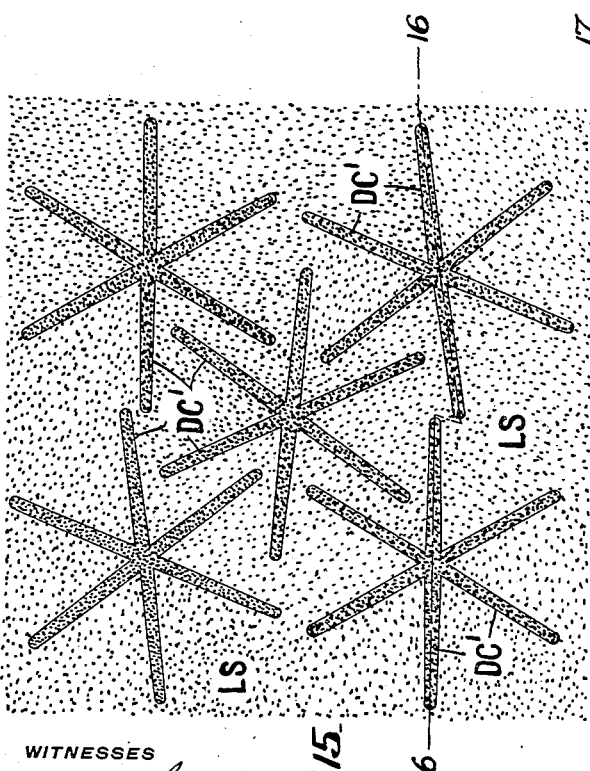
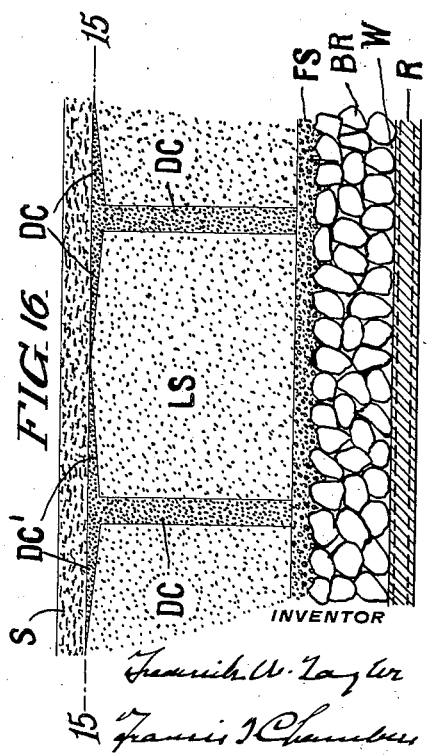

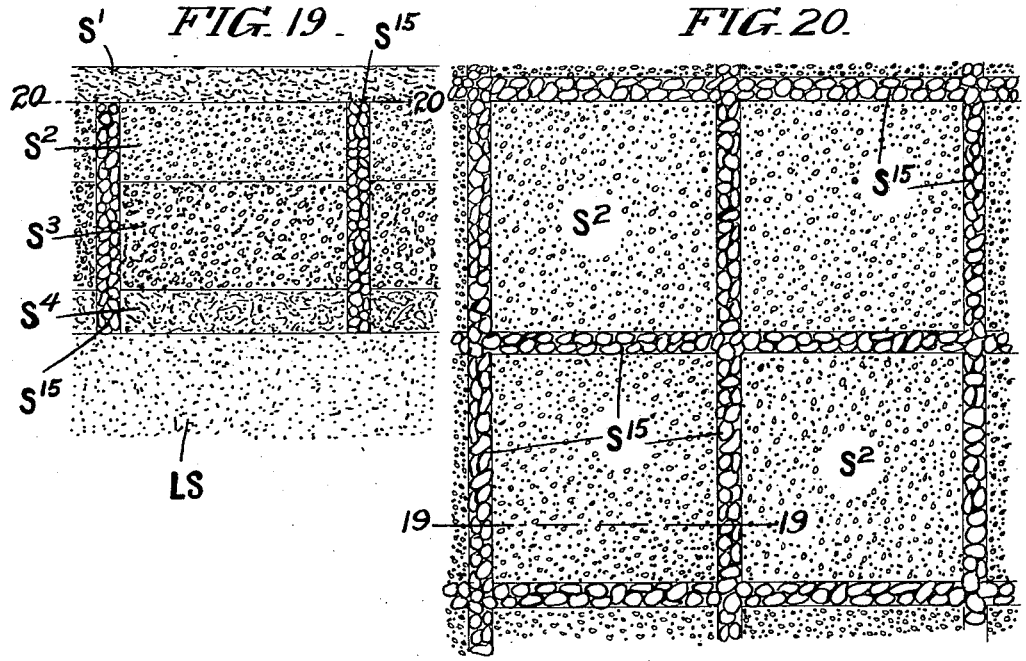
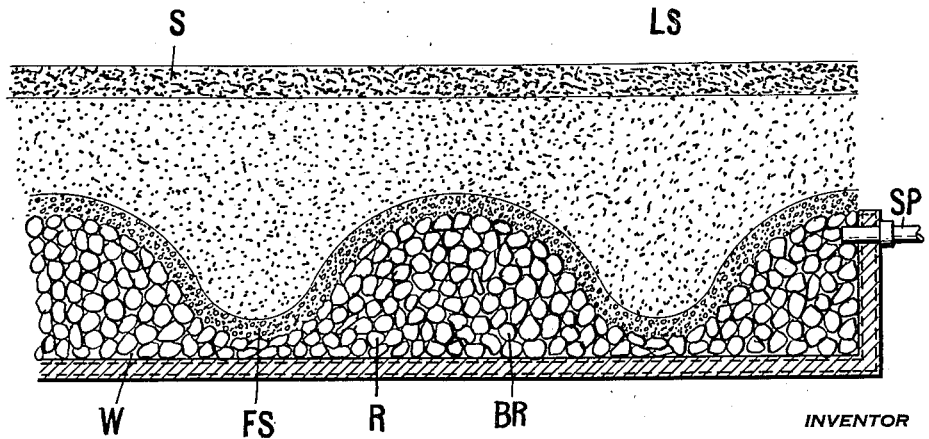

F. W. TAYLOR, DEC'D.
E. W. CLARK, 3D, EXECUTOR.
PLANT GROWING APPARATUS.
APPLICATION FILED JULY 26, 1910.

1,171,558.

Patented Feb. 15, 1916.

UNITED STATES PATENT OFFICE.

FREDERICK W. TAYLOR, OF PHILADELPHIA, PENNSYLVANIA; EDWARD W. CLARK, 3D, EXECUTOR OF SAID TAYLOR, DECEASED.

PLANT-GROWING APPARATUS.

1,171,558.   Specification of Letters Patent.   Patented Feb. 15, 1916.

Application filed July 26, 1910. Serial No. 573,958.

*To all whom it may concern:*

Be it known that I, FREDERICK W. TAYLOR, a citizen of the United States of America, residing in the city and county of Philadelphia, in the State of Pennsylvania, have invented a certain new and useful Improvement in Plant-Growing Apparatus, of which the following is a true and exact description, reference being had to the accompanying drawings, which form a part thereof.

My present invention relates primarily to the means employed and steps taken to obtain a growth of grass such as is desired on the putting greens of golf courses, and in one aspect my invention may be regarded as consisting in an improved putting green or like grass growing structure.

To obtain a satisfactory growth of grass suitable for the purpose specified, it is essential that the grass roots should receive a proper supply of nourishment, moisture and air, and the latter constituent is no less important than the first two. In growing grass on putting greens I believe it to be always desirable, and in some cases absolutely essential to provide conditions which will cause the grass roots to penetrate the soil to a considerable depth below the surface of the ground, I have found that the grass known as red fescue (*Festuca rubra*) which I consider one of the most, if not the most, desirable grass for putting greens, will not prosper under climatic conditions such as are experienced in Philadelphia, Pennsylvania, for instance, unless the roots are caused to penetrate the ground for a distance of at least two or three inches, and the same is true to a greater or less extent with other grasses. This I believe to be due to the fact that the first two or three inches of ground below the surface vary in temperature rapidly with the temperature conditions at the surface of the ground. In particular this top layer dries out and bakes very rapidly under the direct action of the sun's rays on a hot summer day, with a consequent burning or scalding and deadening of the grass roots contained therein, unless vigorous and substantial extensions of the roots lie below this top layer and in contact with a moist and cooler portion of the ground. It is desirable also to provide conditions which will exclude worms and the consequent annoying worm casts from putting greens. Conditions should also be such as to make difficult the propagation of weeds or other foreign vegetation, the seeds of which may blow on to the putting green.

The general object of the invention is to provide a grass growing bed characterized by the presence of the above indicated desirable conditions, and the invention consists in part in the arrangement and composition of the material actually penetrated by the growing grass roots, and in part in the provisions made for supplying the grass roots with the necessary moisture from a reservoir beneath the material in which the grass roots grow.

A characteristic of the invention is the systematic manner in which the putting green or the like is formed and treated to thereby insure the desired uniformity as well as excellence in the turf conditions of all parts of the green required to make a first class green.

To a large extent my invention involves an appreciation and utilization of certain characteristics of granular bodies. It is a fact well known to those who have investigated the subject that a mass composed of rigid granules contains spaces or voids which in the aggregate form a considerable percentage of the total volume apparently occupied by the mass. In the case of rigid spherical bodies or granules of uniform size, the void volume is about forty per cent. of the total apparent volume, and this is independent of the actual size of the individual granules. Of course the smaller the particles the smaller the individual voids, but as the individual voids decrease in volume they correspondingly increase in number. Where the bodies are not smooth, but are irregular in contour, the void space percentage increases, other things being equal. The percentage of void space in ordinary fine sand is about the same as the percentage of void space in broken rock, such as is used, for instance, in macadamizing streets, the voids forming about forty to fifty-five per cent. of the total apparent volume. This void space is reduced by ramming about fifteen per cent., that is, from an average volume of say forty-seven and a half per cent. to between forty and forty-one per cent. The void space in a mass of sand or the like may be diminished in a regulated amount, however, by a proper selection and mixture of granules of different sizes, for if the individual voids between the particles of large size are filled by smaller granules the aggregate void space left will obviously be materially reduced.

Whenever a mass composed of sand or the like has its lower portion in contact with water, the mass acts like a wick to lift water above the normal water level by capillary attraction. The amount of water which will be held in the mass and the height to which the water will be lifted will depend upon the percentage of void space in the mass and the dimensions of individual voids—the height to which the water will be lifted depending very largely on the latter. I have found that by mixing with ordinary sand a considerable percentage of sand which passes through a standard hundred mesh to the inch sieve and also a considerable percentage of sand grain fine enough to pass through a two hundred mesh to the inch sieve a mixture is obtained which will lift water to a height of forty or fifty inches, and by regulating the proportions of the different constituents, a sand mixture may be readily obtained which will lift water to any desired lesser height down to a couple of inches or so. The percentage of moisture which will be held in the sand decreases as the distance above the water level increases. The rate at which the moisture percentage tapers off is different in different sands and depends upon the granular character of the sands, varying, generally speaking, inversely with the height to which the sand will lift water. For convenience I call certain sands which will only lift water for relatively small distances, say up to ten inches, insulating sands, and refer to sands which will lift water higher as lifting sands.

In carrying out my invention in its preferred form, I utilize the water lifting capacity of one or more suitably chosen sand layers to carry water at the proper rate from a subterranean reservoir or water supply which I locate below the grass growing bed, to the grass roots, and I utilize a suitably chosen mixture of sand, gravel, pebbles, broken rock or the like, with suitable plant nourishing food to provide the nourishment, air spaces and root spaces necessary for the production of a satisfactory growth of grass.

The various features of novelty which characterize my invention are pointed out with particularity in the claims annexed to and forming a part of this specification. For a better understanding of the invention, however, and the advantages possessed by it, reference may be had to the accompanying drawings and descriptive matter in which I have illustrated and described several of the forms in which my invention may be carried out.

Figure 1:
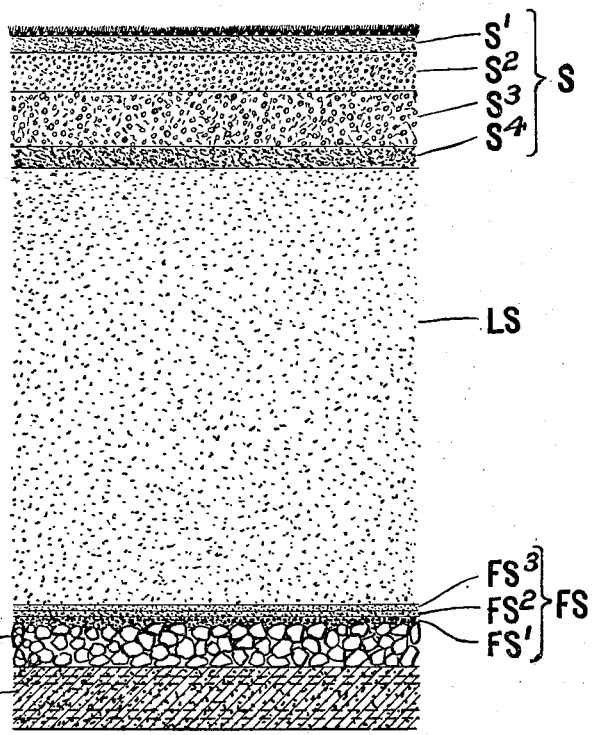
Figure 21:
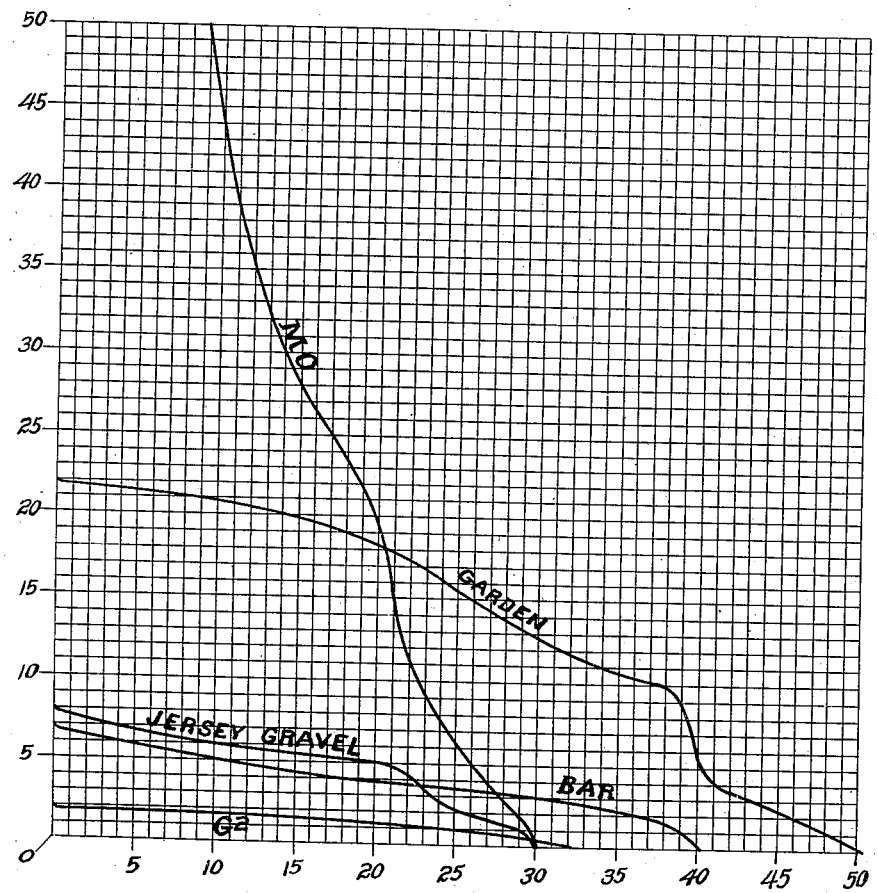

Of the drawings, Figure 1 is a sectional elevation of a portion of a grass growing bed. Fig. 2 is a partial sectional elevation taken similarly to Fig. 1, but on a larger scale showing a lower portion of the bed. Fig. 2$^A$ is a view taken similarly to and on the same scale as Fig. 2 showing an upper portion of the bed. Fig. 3 is a partial sectional elevation of a grass growing bed of slightly different construction from that shown in Fig. 1. Fig. 4 is a view taken similarly to Fig. 3, but on a larger scale, and showing a portion only of what is shown in Fig. 3. Fig. 5 is a view taken similarly to Fig. 3, but showing a different construction especially adapted for use where under ground watering is not practised. Fig. 6 is a sectional elevation of a portion of a grass growing bed of irregular surface contour, illustrating one means for obtaining a transfer of moisture from the reservoir to the grass roots located at different levels above the reservoir. Fig. 7 is a view taken similarly to Fig. 3, but illustrating another arrangement for obtaining a transfer of water from the reservoir level to grass roots located at different distances above said level. Fig. 8 is a diagrammatic plan view illustrating one reservoir water supply arrangement. Fig. 9 is a view similar to Fig. 8 illustrating a different reservoir water supply arrangement. Fig. 10 is a section on the line 7—7 of Fig. 9. Fig. 11 is a partial plan of a putting green construction differing in some respects from those shown in the preceding figures. Fig. 12 shows the surface contour along the line 12—13 of Fig. 11. Fig. 13 is a partial sectional elevation on the line 12—13 of Fig. 11. Fig. 14 is a partial sectional elevation on the line 14—14 of Fig. 11. Fig. 15 is a partial sectional plan of a putting green structure provided with drainage columns, the section being taken on the line 15—15 of Fig. 16. Fig. 16 is a sectional elevation on the broken line 16—16 of Fig. 15. Fig. 17 is a sectional plan of a putting green structure, provided with a wire mesh worm shield, the section being taken on the line 17—17 of Fig. 18. Fig. 18 is a sectional elevation taken on the line 18—18 of Fig. 17. Fig. 19 is a partial sectional elevation taken on the line 19—19 of Fig. 20, illustrating a detail of construction which may be employed. Fig. 20 is a partial sectional plan taken on the line 20—20 of Fig. 19. Fig. 21 is a diagram illustrating the water lifting characteristics of certain granular compositions, and Fig. 22 is a sectional elevation showing a modified reservoir construction.

In the drawings, and referring first to the construction shown in Fig. 1, S represents the root bearing layer in which the roots live and grow. As shown, it is formed of layers $S^1$, $S^2$, $S^3$, $S^4$, the composition and certain specific functions of which are hereinafter described in detail. It will be sufficient at this point to say that the root bearing layer is so arranged and constituted as to provide on the one hand, the necessary voids serving as air pockets and spaces in which the roots may grow, and on the other hand to provide the food for the plants and that it serves also to carry to the roots the necessary moisture from the upper surface of the body LS of lifting sand, which lies beneath the layer S and above the water space W. The latter, as shown, is filled with broken rock resting on the bottom wall R of the water containing reservoir located beneath the grass plot. The wall of the reservoir R should be formed of some impervious material, or practically impervious material, and in practice I usually prefer to make it of reinforced concrete.

The lifting sand LS should be of such composition that it will hold a certain desired percentage of moisture or will hold moisture in excess of a certain minimum at its upper surface as hereinafter explained. A lifting sand having the desired water-lifting characteristics may be obtained in many cases by a suitable selection from the various natural sands available, and in other cases may be obtained by mixing natural sands, or by screening natural sands and by using the screening either unmixed, or mixed with natural sands or with other screenings. Under some conditions it may be desirable to use as a lifting sand a granular material which is not a natural product. One material which I have found advantageous for use as a high-lifting sand is the material which I call M. O. sand. This is composed almost entirely of pure silica and is used on a large scale in steel making plants. The water lifting characteristics of granular compositions may be readily determined experimentally as by preparing columns of the compositions to be tested, placing these columns with their lower ends extending into a water reservoir, and after allowing the columns to stand for a suitable period of time, determining according to well known methods the amount of moisture contained in samples taken from the columns at different heights above the water level.

In general the height to which a column of sand will lift moisture, and the percentages of moisture which the sand will hold at different heights above the water level may be fairly well foretold when the granular characteristics of the sand have been determined by sieving. Such a predetermination, however, is not very accurate or definite in the case of the very high lifting sands, due, I believe, to the fact that the capacity of the sand to lift water to a considerable height, say twenty inches or more, depends largely upon the presence of particles too fine to be measured by the ordinary sieving operations. In practice it is not feasible to measure by sieving particles which are fine enough to pass a standard sieve of two hundred mesh to the inch, and it is the presence of particles passing such a sieve and fine enough to float or be held in suspension for a considerable time interval when poured into water that gives a sand its high lifting capacity.

In the course of my experiments to determine the proper materials to be employed in the successful propagation of grass, I have tested many different varieties of sand, and by way of example I give the granular compositions and the water-lifting characteristics of five of these sands, which I designate, for the purpose of identification, as Jersey gravel, G 2 sand, Philadelphia bar sand, garden sand, and the M. O. sand above referred to. Of these sands the Jersey gravel, Philadelphia bar sand and garden sand are all natural sands found in the neighborhood of Philadelphia, Pa. The G 2 sand is obtained by screening Jersey gravel, and the M. O. sand is mostly silica, as above explained. The granular characteristics of these five sands are given in the following table:

Percentages of certain granular compositions passing different sieves.

| Sieve meshes per inch. | Length of side of sieve openings in inches. | G 2 sand. | Philadelphia bar sand. | Jersey gravel. | Garden sand. | M. O. sand. |
| --- | --- | --- | --- | --- | --- | --- |
| 5 | .16 | 100 | 100 | 100 | 100 | 98.6 |
| 12 | .0583 | 97.7 | 97.9 | 88.8 | 96.5 | 83.5 |
| 20 | .0335 | 81.2 | 96.0 | 77.8 | 89.9 | 78.0 |
| 40 | .0148 | 10.8 | 72.0 | 50.1 | 75.3 | 69.0 |
| 50 | .0110 | 7.9 | 42.5 | 34.6 | 67.4 | 65.5 |
| 100 | .0055 | 1.3 | 3.0 | 7.3 | 35.8 | 46.0 |
| 200 | .0030 | 0.5 | 1.0 | 1.4 | 18.3 | 23.5 |

It will be understood that the sieves referred to above are standard sieves in which the number of meshes per inch means the number of meshes per linear inch.

The water lifting characteristics of the different sand compositions specifically referred to are graphically illustrated in Fig. 21, of the drawings, wherein the abscissæ measured along the water line X—X represent the moisture percentages; and the ordinates measured along the line Y—Y represent the heights above the water level line X—X; and the different curves shown in Fig. 21 show how the correspondingly named sand compositions vary in the percentages of moisture held by them at different levels above the water level.

In the G 2 sand the void space is forty one and eight tenths (41.8) per cent. of the total apparent volume of the sand, and in the test, represented by the G 2 curve in Fig. 21, the percentage of moisture varied with the elevation above the water level, from a maximum of about thirty two (32) per cent. at the water level to practically nothing at two (2) inches above the water level.

In the Philadelphia bar sand the void space is forty-three and three tenths (43.3) per cent. of the total apparent volume, and in the test, the result of which is shown by the curve in Fig. 21, the bar sand held a little more than forty (40) per cent. of moisture at the water level; thirty eight and three tenths (38.3) per cent. at an elevation above the water level of one and one half inches; twenty five and seven tenths (25.7) per cent. at an elevation of three and one half inches; fourteen and two tenths (14.2) per cent. at an elevation of four and one half inches; one and nine tenths (1.9) per cent. at an elevation of six and a half inches and practically no moisture at an elevation of seven inches.

In the Jersey gravel the void volume is thirty three and three tenths (33.3) per cent. of the total volume. This sand owes its relatively small void space to the fact that it is natural mixture of sand grains of different size such that the voids between the larger grains are to a large extent filled by smaller grains. In the test represented by the Jersey gravel curve in Fig. 21, twenty nine and two tenths (29.2) per cent. of moisture was contained at an elevation of one (1) inch above the water level; twenty three and six tenths (23.6) per cent. at an elevation of three inches; twenty one and four tenths (21.4) per cent. at an elevation of five inches; ten (10) per cent. at an elevation of six inches, and practically no water was held by the sand at an elevation of eight (8) inches.

In the garden sand the void space forms about fifty three and seven tenths per cent. of the total apparent volume, and in the test, the result of which is shown in Fig. 21, the percentage of moisture contained in the sand at the water level was slightly over fifty per cent.; at five inches above the water level it was a little over forty per cent.; at ten inches was thirty eight per cent.; at twelve inches was a little over thirty-one per cent.; at sixteen inches above the water level was about twenty-four per cent.; at twenty-one inches was a little over nine per cent.; and at twenty-two inches above the water level was zero.

In the M. O. sand the void space forms forty-seven per cent. of the total apparent volume, and in the test, the result of which is shown in Fig. 21, the percentage of moisture held at the water level was about thirty per cent., and this percentage decreased gradually with the elevation above the water level the percentage being twenty-one (21) at fifteen (15) inches above the water level, and a little over seventeen (17) at twenty-five (25) inches; at thirty-five (35) inches, about twelve (12) per cent., and at fifty (50) inches about nine (9) per cent. The high water-lifting capacity of the M. O. sand is due, I believe, to the fact that a very considerable percentage of this sand is so finely subdivided as to make it proper to refer to it as an impalpable powder. In considering the granular composition of the M. O. sand with relation to its water-lifting capacity, it should be noted that this sand contains a considerable percentage of lumps too coarse to pass a 40 mesh sieve, and yet which, with a small pressure can be crushed into very fine particles or grains and that owing to this peculiarity this sand probably will lift water higher than would be the case if these were solid particles. The rate at which water is lifted by the M. O. sand above the level of say thirty-five (35) inches above the reservoir water level is quite slow, too slow, I believe, under ordinary conditions to supply water to a superimposed root-bearing layer fast enough to compensate for the loss by evaporation and to supply the needs of the roots contained in said superimposed root bearing layer.

In the tests just referred to the sands were slightly compacted, but were by no means as dense as it is possible to make them. The percentage of moisture held at any level by a lifting sand, and particularly a high lifting sand, varies, as I have pointed out, with the composition of the sand, and is affected by the density, or compactness of the sand, and of course it will be understood that the results given are determined experimentally and in any case may involve slight errors, but they do serve to illustrate the character of the differences between the water lifting effects of different sands.

With such an arrangement as that shown in Fig. 1, water falling on the surface of the ground in excess of the amount which will be held in suspension, so to speak, by the root bearing layer will pass downward through the lifting sand into the reservoir, and I have found that a sand which will lift water a considerable height above the water level, say thirty or forty inches, will pass water downward quite rapidly. As the lifting sand is composed in large part of fine grain sands, provisions must be made to prevent the water coming down through the lifting sand from carrying the fine sand particles into the broken rock at the bottom of the reservoir. This may well be accomplished by interposing a suitable filter screen between the lifting sand and the broken rock. This screen may be similar to that ordinarily used in filter beds. For instance, it may be composed of layers, one on top of another, of fine broken stone, small pebbles, and fine sand. In Fig. 2 FS is a filter screen composed of layers of this character indicated in the order named by the symbols $FS'$, $FS^2$, and $FS^3$. Provisions must also be made for carrying away from the reservoir any excess of water which may pass into the reservoir, in order to avoid liability of drowning the roots, so to speak, for if the grass roots are totally submerged in water, for even a few days in warm weather, the absence of air, then excluded by the water, results in deadening the roots, which begin to ferment and decay.

While, as I have pointed out, the root bearing layer, and the body of lifting sand beneath it, constructed and arranged in accordance with my present invention are, on account of their porosity, quite effective to pass an excess of water supplied to the surface of the ground down to the reservoir. I find it desirable in some cases to make additional drainage provisions for rapidly carrying off an excess of water delivered to the ground of the reservoir, without causing it to pass down in a distributed stream through the lifting sand. One advantageous arrangement for this purpose consists in providing vertical drainage columns at frequent intervals in the body of the lifting sand, as illustrated in Figs. 15 and 16, where DC represents the drainage columns. These drainage columns are formed of a very coarse, open sand, or of a fine gravel, and may be placed thirty inches or so apart. I prefer coarse sand to open gravel, as columns of coarse sand of the character specified serve effectively as drains, and with the coarse sand there is much less liability of the lifting sand sifting into the columns and filling up the pores thereof, than is the case where the columns are formed of open gravel. Preferably, I provide the drainage columns with horizontal branches DC' at their upper ends, which may be formed by making grooves in the upper surface of the body LS of lifting sand and filling these grooves with the same or like material that the bodies of the columns are composed of. One of the main objects of these drainage columns is to prevent an excess of rainfall or any top watering of the grass from interfering with the liquid supply of food which should come up from the bottom of the reservoir to the grass roots. Such grass food, for instance, as nitrate of soda, liquid cow manure or sheep's manure dissolved in water should in many cases be poured into the water in the bottom of the reservoir beneath the lifting sand. From the reservoir such plant food is soaked up by the lifting sand and passed over to the root bearing layer above the lifting sand. If no such drainage provisions were made, in the course of a heavy rain, for instance, the water soaking down through the root bearing layer and then through the lifting sand to the reservoir, would carry away with it a large part of the liquid plant food then impregnating the lifting sand, and being carried by it up to the roots. The plant food which would thus be carried down to the reservoir would in many cases be wholly or largely carried out of the reservoir, under the circumstances, through the overflow pipe or pipes and be wasted. With the drainage columns arranged as described, however, the excess of water falling on the surface of the ground and carried down to the reservoir for the most part through the drainage columns does not materially interfere with the liquid plant food contained in and being carried by the lifting sand up to the grass roots.

As ordinarily constructed at the present time, some, in fact very many of the putting greens of the best golf courses have a non-level surface contour, and in Figs. 6 and 7 I have illustrated two different types of construction for maintaining the proper amount of water in the root bearing layer of a putting green of irregular contour by the use of lifting sand which carries the water to the root bearing layer from a single reservoir located beneath the green.

In the arrangement shown in Fig. 6, P represents a water supply pipe formed of tile with open joints through which water may escape, the pipe and particularly the joints thereof, being covered with broken rock BR to break up the streams of water issuing from the pipe joints and prevent them from washing away the filter screen layer FS. OP represents an overflow supply connection limiting the height of the water level in the reservoir R. This pipe may discharge directly into the surrounding ground, when the latter is composed of gravel or the like, adapted to drain off the water rapidly, or it may be continued to some suitable reservoir, dump or main drain. The supply pipe connection SP to the pipe P may advantageously be controlled by a valve PV located within or adjacent to the limits of the putting green and adapted, for instance, to be operated by a socket wrench inserted through a pipe PV' leading from the surface of the ground at some convenient point within or close to the putting green and normally closed at its upper end by the cover PV². In this construction the body of lifting sand is divided into vertical columns LS¹, LS², LS³, LS⁴, LS⁵, LS⁶, of different heights and formed of lifting sands of different granular composition, the composition of each column of lifting sand being so chosen that the same percentage of moisture is maintained in the upper ends of the various columns by reason of their wick-like action. This arrangement, with a root-bearing layer S of uniform character covering the tops of the various columns, insures a moisture distribution throughout the root-bearing layer, which does not vary with the variations in the height of that layer above the reservoir level. It is, of course, essential that the percentage of moisture at the tops of the various columns of lifting sand should be such that with the character of the particular root-bearing layer superimposed thereon the root-bearing layer will hold and maintain the proper percentage of moisture. In this form of the invention the water-lifting capacity of the root bearing layer may or may not be the same as the water lifting capacity of the material employed in some of the columns of the lifting sand proper beneath it. In general, however, it will not be the same, since the different columns LS', LS², etc., are of varying composition, while preferably the portions of root bearing layer S over the different columns are all alike. In this form of the invention the tops of the columns of lifting sand and the lowermost portion of the root bearing layer S ordinarily contain substantially less moisture than will be held by the portions of the columns at or slightly above the water level. With this form of the invention it is apparent that the water level in the reservoir must be kept at a substantially constant level.

The arrangement shown in Fig. 7 for supplying water to grass roots located at different levels above the reservoir is more simple, and ordinarily I consider it preferable to that shown in Fig. 6. With the construction illustrated in Fig. 7 the body of lifting sand LS⁷ may be a high lifting sand of such composition that moisture in excess of a predetermined minimum will be held by the sand at all points along its upper surface, regardless of the differences in elevation between these points and the water level. With this arrangement the root bearing layer itself must be so constructed as to serve as a water distribution regulator, effective to maintain the proper percentage of water in its various portions, when it rests upon a body of lifting sand holding not less than a certain minimum of percentage of moisture at all points along its upper surface, and of course the root bearing layer must be of such a character that it will not take up more water than is needed from the lifting sand at low points in the surface of the latter, where the percentage of moisture in the lifting sand exceeds the minimum. The minimum amount of moisture at the surface of the lifting sand LS⁷ which may be safely employed will vary with conditions and the character of the root bearing layer. In general, the minimum percentage of moisture which may be employed will be between ten and twenty per cent. Where the root bearing layer is composed of small stones (hereinafter defined) with the spaces between the small stones more or less completely filled by fine or high lifting sand, usually mixed with some leaf mold, the minimum percentage of moisture in the body of lifting sand LS⁷ may be smaller generally speaking than where the root bearing layer is composed of the same kind of small stones with the material in the void spaces thereof composed largely of a sponge-like material, such as leaf mold, the properties of which are hereinafter referred to. This notwithstanding the fact that the percentage of moisture which will be held by the leaf mold itself will be substantially greater than the percentage of moisture held by the lifting sand in the void spaces of the small stones of the root bearing layer, when the two root bearing layers are placed on lifting sand supports holding the same moisture percentage at their upper surfaces, provided this moisture percentage is not less than the minimum necessary for the sponge like action of the leaf mold to become effective.

With the arrangement shown in Fig. 7 the root bearing layer as a whole should in general be of such a character as described by the term insulating sand and this is generally though not necessarily the case with all root bearing layers proper. With the arrangement shown in Fig. 7 any variation in the water level in the reservoir beneath the green within quite wide limits is without effect on the distribution of water in the root bearing layer S. The overflow connection OP may consequently be located at a height above the bottom of the reservoir substantially greater than the corresponding height in the construction shown in Fig. 6.

The constructions illustrated in Figs. 6 and 7 are alike in that in each case between any point within the root bearing layer and the reservoir a wick is interposed which is formed in part by the body of lifting sand proper and in part by the portion of the root bearing layer at and beneath the point and above the lifting sand proper. This wick in each case serves to maintain the proper moisture in the root bearing layer and the percentages of moisture thus maintained at corresponding points in the two constructions may be the same. With the construction shown in Fig. 7 the regulation of the percentage of moisture at any point in the root bearing layer is determined by the water lifting capacity of only a short portion of the wick, namely, the portion of the wick formed by the root bearing layer at and beneath the point. In the construction illustrated in Fig. 6, however, the percentage of moisture maintained at any point in the root bearing layer is really determined by the character of the portion of the wick formed by the body of liftng sand below the root bearng layer, although, of course, it is true that the percentage of moisture at any point in the root bearing layer is dependent upon the character of the root bearing layer at and below the point as well as on the character of the lifting sand proper beneath the point.

In some cases where the difference in levels of different portions of the putting green are substantial, it may be well to provide separate reservoirs having different water levels beneath different portions of the green, and one construction of this character is illustrated in Figs. 11, 12, 13, and 14, hereinafter described.

The reservoirs and the means for supplying water to, and drawing it off from them may be constructed and arranged in many different ways. In Fig. 8 the water pipe P' which may be composed of tile with open joints covered with broken rock BR as in the construction shown in Figs. 6 and 7, is arranged in convolutions in the bottom of the reservoir. SP represents a connection to the inlet end of the pipe P' through which water may be supplied from any suitable source, and OP represents the overflow pipe.

In the construction shown in Figs. 9 and 10, the bottom of the reservoir is covered by broken stone BR, which is heaped up adjacent the supply and overflow connections SP' and OP' respectively, to prevent the streams of water entering and leaving through these pipe connections from washing down and disarranging the lifting sand LS and the protecting filter screen layer FS. It will of course be understood that the supply connections SP, SP' may receive water from any suitable source. That is, the supply pipe may be connected to a water distribution system, or to a spring or reservoir or be fed from a well by a pump, or may take surface drainage from rains and melting snow, depending on climatic conditions and the conditions of use, and this applies to all forms of the invention in which the under green reservoir and superimposed lifting sand arrangement is employed. The reservoir in some cases may be of greater area also than the surface of the green above it.

In the complete putting green structure shown in Figs. 11, 12, 13 and 14, R' and R² represent two reservoirs underlying the green and having different water levels to correspond with the general contour of the green, one half of which, as shown by the contour line CL in Fig. 12, is generally higher than the other half. The two reservoirs R' and R² and the portions of the green above them are substantially identical. As shown, trough-like water-containing chambers RW are formed in the bottom of each reservoir. Preferably, as shown, they are formed of reinforced concrete and are provided with reinforced concrete covers RW'. At intervals along the length and at each side of each of these chambers RW, water outlet passages RO lead away from the lower sides of the chambers RW. The bottom of each reservoir should preferably be covered, as shown, by a layer BR of broken stone which is carried up above the water outlets RO, and is covered by the usual filter screen layer FS. The lifting sand LS⁹ covers the entire reservoirs including the tops of the chambers RW. Water connections RS are provided between the different chambers RW, in the different reservoir sections, and air pipe RA should also be provided for connecting the upper portions of the chambers to equalize the air pressure and water levels therein. SP² represents a supply pipe adapted to convey surface drainage from the surface of each green section to the reservoir section beneath it. As shown, the pipe SP² is closed at its lower end as by means of the cement block SPB, and is provided with a discharge port SPO just below the under surface of the channel cover RW', through which the tube projects and the pipe is made removable so that silt and the like carried down into the pipe, may collect at its lower end and be readily cleaned out from time to time. To facilitate the removal of the pipe SP² it is preferably surrounded by a sleeve SPS having its lower end embedded in the cover RW'. It will of course be apparent that water may be supplied to each reservoir section by discharging water into it as through a hose inserted in the pipe SP². OP² represents the overflow connection from each reservoir section which discharges into a well or sewer M outside of the reservoir adjacent the end of one of the channels.

The lifting sand LS⁹ in each section may be divided into vertical columns of different compositions as in Fig. 6, or the arrangement of Fig. 7 may be employed, and as before indicated I usually prefer the latter arrangement.

In constructing putting greens or the like the root bearing layer in which the grass roots live and grow are preferably formed by mixing gravel, coarse sand or the like, with a suitable plant food, which itself has a considerable water lifting and holding capacity. In any event the material composing the root bearing layer should be of such a character as to provide the desired combination of air spaces and food and water supplies.

In practice I have obtained excellent results by employing as the principal plant foot constituent in the root bearing layer, the leaf mold or humus which is obtained from the upper layers of soil in hard wood forests, incorporating this leaf mold in small stones to provide the desired porosity. In some cases the leaf mold and small stones may have some fine sand added.

By the term "small stones" as used herein and in the claims, I mean to include stone or stone-like particles fine enough to pass through a sieve of say one mesh to 1¼ inch, and coarse enough to be held on a sieve of, say, twenty mesh to the inch, regardless of whether or not these particles are in the forms commonly referred to as "broken rock," "pebbles," "coarse sand," or the like.

While a considerable variation in the size of the small stones used is permissible in forming different greens or different green portions and even larger stones than the largest mentioned in the preceding paragraph, may sometimes be used, the small stones used in any one green portion should be tolerably uniform in size. From what has already been said it will be apparent that if the small stones used in any one green portion included substantial amounts of stones of different sizes the void space would be substantially decreased and this would be objectionable.

The leaf mold which I prefer to use should be thoroughly decayed and for this reason I prefer to take the leaf mold not from the very top of the forest soil but from the layers slightly below the surface. The leaf mold should be free from coarse particles and for this reason I prefer to screen it in many cases by passing it through a screen of say twenty mesh to the inch. By mixing the leaf mold with small stones in amounts insufficient to fill the void spaces in the stones, a root-bearing layer is obtained which is admirably adapted to provide the necessary air and root spaces, food supply and water-lifting and holding properties.

Certain important characteristics and properties of leaf mold and specific modes of using it are hereinafter discussed in detail. Attention is called at this point, however, to the fact that in some cases it is desirable to mix with the leaf mold incorporated with the small stones in the root-bearing layer, more or less high-lifting sand on account of the water-lifting and holding properties of the latter. Of course it will be understood that in place of the leaf mold, other substances containing organic material and certain mineral manures may be employed, and in some cases it may be desirable to mix with the leaf mold, when used, certain other fertilizing materials such as bone meal. The leaf mold obtained in the manner described is exceedingly sponge-like in its action, and in some cases will hold water to the extent of seventy per cent. of its own bulk, and by mixing it with a granular mass composed wholly or largely of small stones, I obtain a root-bearing layer, which, when properly supplied with moisture, serves admirably to provide the grass roots with nourishment, air and water.

In making the root-bearing layer S of a putting green or the like, there are two principles of construction which may be followed. To induce the grass roots to penetrate the ground to the desired depth when constructed in accordance with one of these principles, the root-bearing layer is composed of first, an upper germinating layer in which the grass seeds are planted and start to grow; second, an intermediate layer beneath the germinating layer, which consists principally of small stones, and preferably contains some plant food and preferably serves to hold some moisture, but is generally of a lean and dry character so that the roots tend to pass through this layer in search of more abundant food and moisture supplies; and third, a layer of gravel or sand mixed with substantially larger percentages of plant food and holding substantially more moisture than the second layer. These three layers may each vary in composition and the second and third layers in particular may grade off more or less insensibly into each other, each layer may vary in thickness, and each may comprise one or more strata differing in composition. The second or third layers may, one or the other or both, be formed in whole or in part to prevent, or may have incorporated in them means for preventing worms from working in the green.

The second principle of construction which may be employed to induce the grass roots to penetrate the green to the desired depth consists in forming the portion of the root bearing layer beneath the upper germinating layer so that the individual food spaces therein are large and are but partially filled with a substance which serves as a source of plant food for the roots and also to hold the proper moisture supply. With a root bearing layer constructed in accordance with this principle, the main grass roots have ample freedom to pass downward and to throw off suckers to the moisture and food containing pockets, to thereby absorb food and moisture, selectively, so to speak, in accordance with their requirements.

In Fig. 1 I have illustrated a concrete example of a preferred construction of the root bearing layer S above mentioned, in which the first of the principles of construction is followed. In Fig. 1 the layer S is composed of four strata, S', S², S³, S⁴. Of these the layer S⁴ directly superimposed on the lifting sand body LS is about one inch thick and is formed by mixing together one part of leaf mold and three parts of the comparatively fine sand which I call "garden" sand, the leaf mold and sand mixture being moistened sufficiently to make the sand and leaf mold mix properly and to secure a close packing material without disturbing the surface of the lifting sand and without becoming disturbed by the putting in place of the layers or strata thereafter superimposed, and to secure also an avoidance of an uneven distribution of particles of different size contained in the layer.

In obtaining the mixture above specified as well as in the case of all other mixtures herein described the proportions are by volume and the sand and leaf mold are measured loose and not compressed and this applies to all other mixtures of solid material described herein.

The amount of water to be added to the sand and leaf mold forming stratum $S^4$ and to the other stratas, will vary, of course, with the moisture already in the materials handled. In general, however, in all compositions of this character, when the sand and leaf mold are practically dry so that the leaf mold, for instance, will readily pass through a twenty mesh sieve, enough water should be added to the leaf mold so as to make it contain water equal to about forty per cent. of its volume. The sand and leaf mold should be thoroughly worked together as cement and sand are mixed in making mortar tests, and when the material forming the layer $S^4$ is put in place it should be compacted as little as is practicable.

The layer $S^3$ is about three and one-fourth inches thick and is formed of pebbles, which will pass a five mesh sieve and be held on an eight mesh sieve, mixed with leaf mold and moistened, two parts of leaf mold being mixed with seven parts of the pebbles. This layer after being put in place should be pressed or rolled down to make it as dense as it is practical to make it by such a pressing or rolling operation, for reasons hereinafter explained.

It should be noted that it is not feasible to compact pebbles or the like as much when the pebbles rest on a body of lifting sand as when the pebbles rest on a less yielding support.

The layer $S^2$ is generally similar to layer $S^3$ although the pebbles are smaller and the amount of leaf mold is reduced. In this stratum, which is about three-quarters of an inch thick, one part of the leaf mold is mixed with six parts of pebbles which pass a sieve of eight mesh to the inch and are held on a sieve of fourteen mesh. The layer $S^2$ like the layer $S^3$ is compacted by pressing or rolling to make it as dense as practicable.

The germinating layer $S'$ is about three-fourths of an inch thick and is initially composed of eight parts by volume of germinating material and one part of Red Fescue grass seed. The germinating material is composed of one part of leaf mold in combination with one or more parts of the sand, which I call "Philadelphia bar sand." The germinating material after being thoroughly mixed and properly moistened may be put in place by the use of a trowel or like device.

The object of using a sand of the granular composition of Philadelphia bar sand in combination with leaf mold as a germinating material is that with this sand the seeds germinate and the spears of grass find their way to the surface about equally well whether the germinating layer is left loose or is compacted, say by being walked upon.

In Figs. 3 and 4 I have illustrated a putting green construction formed to provide large individual void spaces through which the large grass roots may freely pass, the construction thus following the second of the two principles of construction referred to above. In Fig. 3, $S'$ represents the germinating layer, which may be identical in construction with the germinating layer of Fig. 1. Between the germinating layer and the lifting sand is a layer $S^5$, which may be from 3 to 6 inches thick, and is formed by mixing pebbles which pass a sieve of two mesh to the inch, and are caught on a sieve of three mesh to the inch, with leaf mold, in the proportion of seven parts of pebbles to two parts of leaf mold, the mixture being moistened and compacted preferably as described above with reference to the strata $S^2$ and $S^3$. As seen from Fig. 4, when the layer $S^5$ is thoroughly compacted so that the pebbles SS bear against one another large individual void spaces $S^6$ are left, which are only partially filled by the leaf mold distributed throughout the layer.

The root-bearing layers heretofore described in detail are particularly adapted for use over a wet basin or reservoir from which water is carried to the grass roots by lifting sand.

The same general principles of construction of the root-bearing layer apply however, when the root-bearing layer receives its moisture from above although, of course, certain modifications are necessary in such case. In Fig. 5, I have illustrated a concrete example of a grass root layer construction for use in a top watered green. In Fig. 5, $S'$ represents the germinating layer which may be identical with the germinating layers of Figs. 1 and 3. Beneath the germinating layer is a layer $S^7$ preferably about five inches thick, and of the same composition as the layer $S^5$ of Fig. 3 to wit: The layer is composed of seven parts of pebbles which pass a sieve of two mesh to the inch and are held on a sieve of three mesh to the inch, mixed with two parts of leaf mold. Beneath the layer $S^7$ is a layer $S^8$ composed of leaf mold and broken stone, preferably about 4 inches thick. In the layer $S^8$ one part of leaf mold is mixed with three parts of broken stone. The layers $S^7$ and $S^8$ may advantageously be put in place and compacted in the manner described in connection with the layers $S^2$ and $S^3$ of the construction illustrated in Fig. 1 and the layers $S^7$ and $S^8$ may be compacted even more thoroughly than the layers $S^2$ and $S^3$. Beneath the layer $S^8$ is placed a layer $S^9$ which may be about two inches thick and is formed of broken stone. In the construction just described the leaf mold in the layers or stratas $S^7$ and $S^8$ insures a retention in them due to the spongelike action of the leaf mold of a large percentage of water which passes down into the root-bearing layer, when the surface of the ground is watered either artificially or by rainfall. At the same time the large individual void spaces prevents the roots extending into these strata from being smothered or drowned and the layer $S^9$ is effective as a drainage shield to carry off, either to a drain or to the supporting ground, when the latter is sufficiently porous, the excess of water passing down into the root-bearing layer at the times when heavy rainfalls occur or excessive amounts of water are otherwise supplied to the surface of the green.

It will be understood that the proportions and dimensions stated of the different root-bearing layers specifically described are merely illustrative. Different conditions require or may make desirable different compositions and arrangements.

The use of pebbles of tolerable uniform size as described above in the layers $S^2$ and $S^3$, insures a relatively large void space. With pebbles generally round in shape and of the uniform size insured by the sieving provisions described, the void space will be about thirty-five per cent. when the pebbles are thoroughly compacted. The volume of leaf mold added to the pebbles in the strata $S^2$ and $S^3$ is less than the volume of the void space in the pebbles and moreover, the measurements are by volume of the leaf mold and pebbles when dry and the leaf mold when throughly wet shrinks and occupies a smaller volume than when dry.

The use of strata in the root-bearing layer formed and compacted as the strata $S^2$ and $S^3$ are formed and compacted has two important advantages. In the first place the mowing, rolling and walking on the putting green which tend to mat down the grass on the surface of the green and make it smooth and uniform, as is highly desirable, do not effect the already densely compacted strata $S^2$ and $S^3$, while in the case of putting greens as heretofore constructed the mowing, rolling and walking on the green particularly when the green is wet not only smooth and roll out the surface of the grass and the roots immediately below the surface, but also continually compact and make more dense the deeper portions of the root-bearing layer, thus as time goes on making less and less space between the grains of sand for the grass roots to live and develop in. In the second place, the compacted pebble containing layers $S^2$ and $S^3$ are difficult of penetration by worms.

Ordinarily, worms enter a putting green from three directions. They come in laterally under the green from the adjacent grass fields; they also come up after the winter is over, from deep down in the ground beneath the root-bearing layers; they also travel across the top of the grass and bore down into the ground from the upper surface. The hard rammed pebbles in stratas $S^2$ and $S^3$ are especially discouraging to worms attempting to enter the putting green from beneath the root-bearing layer or to come in from the sides of the green. Pebbles of the size specified above for the layers $S^2$ and $S^3$ when compacted leave too small a space between the adjacent pebbles to permit the worms readily to work in them, and the pebbles are too thoroughly compacted and too large to be swallowed and digested, so to speak, by the worms.

Round or roundish pebbles should be used in the upper portions of the root-bearing layers of putting green structures, in preference to broken stone or the like particles of the same size, because of the greater facility in forming the ball-receiving cavity or "hole" which as is well known, must be shifted at intervals of a week or so throughout the season. When the "hole" is shifted the abandoned cup cavity should of course, be filled in such manner as to make it uniform in composition with the remainder of the green. In some cases the material cut out in forming the new "hole" may be placed bodily in the old cavity. In general, I prefer however that the green keeper should have available material for remaking the lower portion of the filling for each abandoned hole as the corresponding portion of the green was made originally. The sod and the pebbles containing the grass roots for two or three inches below the surface, which are cut in making the new hole should usually be put into the top of the abandoned hole. As an additional worm preventive particularly effective in preventing worms from entering a putting green by boring down from the upper surface, a worm shield may be placed just below the germinating layer. For instance, as shown in Fig. 2, A, a layer of broken glass of, say five eighths of an inch in thickness, is placed just below the germinating layer. To prevent the material of the germinating layer from going down into the worm shield, the layer may advantageously be covered by a thin filter screen layer, such as is indicated by FS in Fig. 2$^A$. The lacerating action of the glass particles effectually prevents worms working in this sort of worm shield. Another means which I have devised for excluding worms from putting greens or the like, consist in arranging a screen formed of brass wire netting a little below the surface of the ground, this screen being formed of fine brass wire. The mesh of the screen should be fine enough to prevent worms from passing through it, and I believe it to be desirable also to have the mesh of this netting substantially finer than is actually required to prevent worms from passing through it, in order that the netting may accomplish a second purpose, namely: that of discouraging the growth of weeds or foreign vegetation having roots coarser than the roots of the grass which it is desired to grow. By making this netting of a mesh such that there are from thirty to sixty openings to the linear inch, I not only prevent worms from passing through the netting but also prevent the coarser varieties of grass and weeds from thrusting their roots through the netting, although the interstices of the netting are sufficiently large to permit the satisfactory penetration of the roots of the red fescue or like grass. While the netting will not be effective, of course, to prevent weeds and coarse grasses from starting to grow in the portion of the root-bearing layer above the netting, it will by restricting the penetration of their roots into the portions of the root-bearing layer below the netting, result in causing the weeds and coarser grasses to die out during the hot dry spells of the summer, and in this manner the netting prevents such weeds or grasses from obtaining a permanent foothold in the putting green or like grass plot. Preferably, I arrange the netting just below the germinating layer S' as shown in Figs. 17 and 18 where N indicates the netting.

While the cost of new brass wire netting of the fine mesh essential for the purpose specified above, makes the use of such new netting practically impossible, I have found that second-hand wire netting such as is used in Fourdrinier machines and in other processes of pulp and paper making, and which is suitable for the purpose specified, can be obtained at prices which make it commercially feasible to employ such netting in putting green construction.

The leaf mold which I prefer to use as the principal or sole solid plant food constituent, has certain peculiar characteristics and properties which affect and restrict the manner in which the leaf mold may be successfully used. The water-absorbing capacity of the leaf mold decreases with an increase in its density. Loose leaf mold may be readily decreased to one half of its original volume by pressure and while loose leaf mold under favorable conditions will hold about seventy per cent. of its volume of water, the compacted leaf mold will hold only about forty or fifty per cent. of its volume of water. A column of loose leaf mold will hold about the same percentage of moisture, say sixty-five to seventy per cent., throughout the first three inches or so above the water level. Above the 3 inch level the percentage of water held tapers off quite uniformly to a little over forty at the 9 inch level. Above the nine inch level the percentage of moisture held tapers off very abruptly and no water at all will be held by the loose leaf mold at an elevation of 10 or 11 inches above the water level. By compacting the leaf mold the height to which water will be lifted, is somewhat increased but the percentage of water held by the leaf mold is decreased.

Wetting shrinks loose dry leaf mold about twenty per cent. in volume. While loose leaf mold placed on top of a body of lifting sand holding twenty to twenty-five per cent. of moisture at its upper surface will absorb water from the lifting sand until the percentage of moisture held by the lower portion of the leaf mold rises to fifty per cent. or more, the leaf mold will not effectively absorb water from a lifting sand support where the percentage of moisture in the lifting sand at its upper surface is not as high as fifteen per cent. or thereabout. Leaf mold exposed to air may be kept either wet or dry or alternately wet and dry indefinitely without perceptible souring or rotting. The same leaf mold when kept moist under conditions excluding air, soon rots however. For instance, a layer composed of pure leaf mold compacted and arranged in a root bearing layer a couple of inches or so below the ground will begin to rot in two or three days, if it is soaked with water, and will be thoroughly rotted in the course of a few weeks or months, although the same leaf mold may have been on the ground in the forest in which it was formed for a century or more. In order to provide sufficient air space therein, I prefer, in forming a root-bearing layer strata of leaf mold and small stones, to keep the volume of leaf mold down to two parts or less of leaf mold to seven parts of the small stones, when in the form of pebbles, although the proportion of leaf mold to small stones may be safely increased under favorable conditions, and in some cases I have obtained satisfactory results with a mixture composed of two parts of leaf mold to three parts of small stones in the form of broken rock. The amount of leaf mold to be used depends upon the nature of the small stones with which it is mixed and also upon the degree of ramming or compacting which the mass receives. In any event the leaf mold ought not to be compacted for two reasons, first, because it tends to rot or sour when compacted, and second, there are then too few open root spaces when compacted. With pebbles or a lifting sand if too little leaf mold or equivalent water-lifting material is put into the voids, the pebble mixture will not lift water high enough into the root bearing layer. On the other hand, if not enough void filler is used there will be too much water around the roots and not enough free air space. Therefore the percentage of voids should be determined in the small stones and generally the amount of leaf mold filler shoud be proportioned to the voids. It is best however, in every way to make up a trial mixture and determine by experiment whether it will lift water right.

To permit of the use of a large amount of leaf mold in a root-bearing layer stratum, I have in some cases interspersed bodies containing relatively large and unobstructed air channels or spaces in the leaf mold containing layer. In Figs. 19 and 20 I have illustrated one construction in which these bodies are employed. As shown in Figs. 19 and 20 spaces filled with pebbles $S^{15}$ are formed in the portion of the root-bearing layer S below the germinating layer S'. A convenient way of forming these stone-filled spaces consists in first placing thin boards on edge in the root-bearing layer at the time the latter or rather the portion of it below the germinating layer is formed. After the material composing the root-bearing layer has been set, the boards are withdrawn and the spaces left are filled with pebbles. The spaces are arranged, as shown in Figs. 19 and 20, like cell walls, and the distance between adjacent cell walls may vary from three and one-half inches to eight or ten inches. The pebbles $S^{15}$ may well be about one quarter to three eighths of an inch in diameter. With air conveying bodies such as are formed by the cell walls of pebbles $S^{15}$ of Figs. 19 and 20 I believe it feasible to employ in the root-bearing layer a strata two or three inches thick, of pure leaf mold, not heavily compacted, provided the adjacent pairs of parallel pebble cells are not more than four inches or thereabout apart. But even where air-conveying bodies, such as are formed by the pebble cell walls of Figs. 19 and 20 are employed, I prefer to mix small stones with the leaf mold, as heretofore described as these insure against too great compacting.

While I have employed a germinating layer about three fourths of an inch thick in the specific green structures described herein, it will be understood that this layer may vary in thickness somewhat with conditions, but in any event it should be substantially greater in thickness than anything heretofore used, so far as I am aware which corresponds in any way to my germinating layer. In practice when planting the seed of the red fescue grass, I prefer in no case to use a germinating layer of a thickness materially less than one half an inch, and in many cases I consider it desirable to make the germinating layer one inch in thickness. The use of a thick germinating layer of this character results in a very large and rapid grass root growth. To make this unusually large growth effective and of value, I find it necessary, regardless of whether the root-bearing layer is moistened from an underground reservoir or by surface watering, to provide a root-bearing layer or layers of an open porous character beneath the germinating layer. If a thick germinating layer, such as I prefer to employ, is placed on top of soil mixture, of the ordinary character heretofore employed in putting greens and the like, a considerable percentage of the root growth starting in the germinating layer cannot find room to penetrate the sub-soil, and hence no great advantage is obtained from the use of such a thick germinating layer.

It will be understood that whether or not an underground reservoir is employed with lifting sand interposed between the reservoir and the root-bearing layer to supply the latter with the necessary moisture to maintain the growth of the grass, top watering, either natural or artificial is necessary to start the growth of the grass from the seed incorporated in the germinating layer.

The amount of sand mixed with the leaf mold in the germinating layer may vary through quite wide limits. If no sand at all is used in the germinating layer, the grass seed will germinate but on account of the richness of the layer and the large quantity of moisture which will be held in it, the roots will not as readily and quickly find their way down in the portion of the ground beneath the germinating layer as is desirable and consequently there is more difficulty in carrying the grass through the hot seasons and particularly through the first hot season following seeding. I may note at this point that I ordinarily prefer when possible, to plant the grass seed at the end of the summer season, immediately after the end of the period during which the extremely hot spells are experienced, but with my invention, however, much more satisfactory results may be obtained from spring planting of the grass seed than is possible where older methods heretofore known are employed.

In practice I prefer to add from one to two volumes of sand to one of leaf mold as the presence of sand in the germinating layer has a number of advantages. One advantage, peculiar, so to speak, to the germination of the seed arises from the fact that where one to two parts of sand are mixed with the leaf mold, pressure on the germinating layer, such as is caused by a man walking over it does not compact it to such an extent as to prevent the spears of grass from finding their way to the surface of the ground, while this pressure will keep much of the grass from coming up if less sand is used. The use of a large portion of sand in the germinating layer is a great advantage, moreover, after the growth of the grass is well established.

A layer composed largely of sand at the top of an established green improves the quality of the grass grown on the green, largely, as I believe, because to obtain the best results the trunk or main stem of each grass plant, should be protected for some distance at least against the direct action of the sun, and should be kept dry. The presence of a sand layer surrounding the trunks or main stems of the grass plants above the root crowns serves admirably to protect the grass stems, while at the same time, because of the large void space in this sand layer, the latter is comparatively dry and the grass stems are not subjected to rotting conditions which would otherwise tend to exist. Another important advantage had from the use of a layer composed largely of sand at the top of the green is due to the lean character of this layer whereby the seeds of weeds or other foreign vegetation which may blow on to the green are hindered from germinating and growing. A third advantage due to the presence of a layer composed wholly or largely of sand at the top of the green is due to the fact that this layer discourages worms from entering the green from the top.

That there are advantages in having sand at the top of a green has long been known, and it has long been a common custom to sprinkle thin layers of sand on top of the green from time to time through a period of years. The amount of sand which can thus be sprinkled on to a green at one time, or within any one year, without injuriously affecting the growth of the grass on the green is quite small, usually not more than one eighth to one quarter of an inch at the most.

By the use of a germinating layer composed largely of sand, as hereinbefore described, I provide a green, initially with a top sand layer as thick as can be obtained by sprinkling sand on the green from time to time during several years. I have discovered, moreover, that with a grass similar to red fescue that regardless of whether the grass seed is initially placed on the green in a germinating layer as herein described, or is planted in accordance with the older methods, a sand or lean soil layer of some thickness may be added to the top of the green shortly after seeding without injury to the grass, provided the sand is properly put on the green, within a certain short period following the germination of the seed. When the grass stems first come up through the top surface of the green they stand erect, and do not begin either to branch or to mat to any extent until four weeks or so after the grass stems first appear above the surface of the ground. I have found that a layer of sand from one fourth to three eighths of an inch thick may be safely sprinkled on the surface of the green after the grass stems are well up, and before they have begun to materially branch or mat. Ordinarily the period during which the sand may be thus sprinkled upon the surface of the green without injuring the growth of the grass lies between the end of the fortnight following the first appearance of the grass stems above the surface of the green and the end of the fortnight following.

It is important that the sand used in the germinating layer as well as that sifted on later as a cover should be barren sand, or if a sand containing organic matter is used that it should be sterilized, as otherwise the grass in its young stages is likely to "damp off" or mildew. In order to prevent young grass planted in the manner described from "damping off" it is desirable also, to start to cut the grass about one month, say, after planting, and to keep it cut to from one half to three quarters of an inch high, so that air will have more ready access to the grass stems.

Where a putting green is constructed in accordance with the preferred form of my invention, with an underground reservoir and lifting sand interposed between the reservoir and the root bearing layer, the preferred use of the invention contemplates a continuous and automatic supply of moisture from the reservoir to the root bearing layer. It will be understood, however, that in certain seasons or periods when the natural supply of moisture deposited on the surface of the green is large, it may then be desirable to drain the reservoir. Under some conditions, also, it may be desirable to provide for watering the root bearing layer intermittently by alternately flooding and draining the reservoir beneath the green or like structure. In such cases a proper construction and arrangement of the lifting sand and root bearing layer is not less important than where the reservoir supply of water is continuous, in order to prevent injurious flooding, and to insure that each portion of the root bearing layer obtains a proper supply of air as well as sufficient moisture. Where the reservoir is intermittently flooded and drained however it is usually desirable to so arrange the lifting sand and root bearing layer that water will be lifted from the reservoir more freely than when the reservoir is consistently supplied with water.

In many cases the underground reservoir employed may be of such capacity that it will contain sufficient water, supplied to it by natural drainage at the beginning of a summer, to adequately supply the green with water throughout the summer, without any artificial supply of water to the reservoir. The reservoir or reservoirs supplying water to any green need not necessarily be limited in size by the size of the green. These reservoirs may extend beyond the limits of the green, and where a plurality of reservoirs are employed for any one green, one or more reservoirs may lie wholly without the limit of the green, but it will be understood in any event that each reservoir for a green must either have a portion lying within the green, or be connected to one lying under the green.

To increase the effective capacity of an undergrounnd reservoir to hold water I sometimes place mounds or piles of broken stone on the bottom of the reservoir covering up each mound with a filter screen layer. Such a construction is illustrated in Fig. 22.

The seeds of the red fescue grass are much larger than the seeds of other favorite putting green grasses such as Rhode Island bent, creeping bent, red top, etc. On this account difficulty has heretofore been experienced in obtaining the desired growth of grass from a mixture of such seeds, planted, as they have been, together and close to the surface of the green with a soil covering on top of the seeds of about one-eighth to one-sixteenth of an inch in thickness. In such cases a large percentage, probably ninety-five per cent. of the red fescue seeds have been floated out and washed away by rain or watering. On the other hand, grass stems coming from the small seeds are much finer when young (though coarser when old) than the red fescue stems, and in consequence the finer stems from the small seeds are unable to force their way to the surface of the green if planted deep. To plant a green with a mixture of seeds and at the same time avoid the washing out of the larger seeds and the evil consequences of planting small seeds too deep, I plant the different seeds in superimposed layers. For instance, in planting a green with a mixture of the large red fescue seeds, and one or more of finer seeds as above mentioned, I form a layer about one-half or three-eighths of an inch in thickness of the red fescue seeds and germinating material and sand, and on top of this layer I plant the other seeds. The finer seeds may be put in place on the green in intimate admixture with sand, leaf mold, or the like, or they may be planted in the ordinary ways heretofore employed, or the finer seeds may be sifted on to the green shortly after the red fescue stems have come up above the surface of the green, in the same way as is sand—sifted on the green, as hereinbefore explained. I consider the last named method of planting the finer grass seeds less desirable, however, than the other methods of planting described.

I consider it desirable to feed a young green with a very dilute solution of nitrate of soda once every three weeks or so during the last seven months or so of the first year following the planting of the seed. The solution which I prefer to use is composed of about one pound of nitrate of soda to twenty gallons of water, using not more than one fourth of an ounce of nitrate of soda to each square foot of green surface. Before applying the nitrate of soda solution I first moisten the surface of the green with water about equal in amount to the amount of the nitrate of soda solution to be used. This treatment tends to produce deep rooting of the grass planted, and is conducive also to a rapid, vigorous growth.

To obtain satisfactory results in growing grass in accordance with the present invention, I consider it essential to proceed in a systematic manner, carrying out one or another of the methods hereinbefore described as otherwise the best growth of grass cannot be obtained and in particular the desired uniformity absolutely essential to make a perfect putting green cannot be secured. I also consider it essential to employ an artificial mixture of nutritive and non-nutritive materials in the root bearing layer as it is practically impossible to find a natural mixture in adequate quantities having the proper air and root spaces, plant food content, and water lifting and holding properties.

While in accordance with the provision of the statutes I have herein described and illustrated the best forms of my invention now known to me, it will be readily apparent to those skilled in the art that changes may be made in the form of the embodiments disclosed without departing from the spirit of my invention, and that certain features of the invention may sometimes be employed with advantage without a corresponding use of other features.

Having now described my invention, what I claim as new, and desire to secure by Letters Patent, is:

1. In a putting green or the like the combination with a porous root bearing layer of a water reservoir located below said layer, lifting sand interposed between said reservoir of said layer, the lifting sand and root bearing layer being so constructed that a substantial percentage of moisture, insufficient, however, to fill the void space therein. will be maintained in the root bearing layer through the water holding and lifting action of the lifting sand and the root bearing layer, and provisions whereby an approximately constant water level can be maintained in the said reservoir.

2. In a putting green or the like the combination with a porous root bearing layer of a water reservoir located below said layer, lifting sand interposed between said reservoir and said layer, the lifting sand and root bearing layer being so constructed that a substantial percentage of moisture, insufficient, however, to fill the void space therein, will be maintained in the root bearing layer through the water holding and lifting action of the lifting sand and the root bearing layer, means for supplying water to said reservoir and an overflow connection limiting the height of the water level in said reservoir.

3. In a putting green or the like having a non-level surface the combination with a porous root bearing layer of a water reservoir located below said layer, and lifting sand interposed between said reservoir and said layer, and varying in composition with the variations of the surface level to adapt the lifting sand to supply the portions of said layer at different levels uniformly with moisture drawn from said reservoir by the lifting sand.

4. In a putting green or the like having a non-level surface the combination with a porous root bearing layer of a water reservoir located below said layer, and lifting sand interposed between said reservoir and said layer, and arranged in columnar portions of different granular characteristics to correspond with the surface portions of the green at different levels, to adapt the lifting sand to supply the portions of said layer at different levels uniformly with moisture drawn from said reservoir by the lifting sand.

5. In a putting green or the like having a non-level surface the combination with a porous root bearing layer of substantially uniform thickness, of a water reservoir located below said layer and lifting sand interposed between said reservoir and said layer and of such granular composition that water drawn from the reservoir by the wick-like action of the lifting sand will be maintained at every point in the upper surface of the lifting sand in amount not less than a predetermined percentage.

6. In a putting green or the like having a non-level surface, the combination with a porous root bearing layer adapted to distribute moisture to grass roots contained in it when resting on a body of lifting sand containing not less than a predetermined minimum of moisture at its upper surface, of a water reservoir located below said surface and a body of lifting sand interposed between said reservoir and said layer and forming a support for the latter, said body of lifting sand being uniform in composition and of such water lifting and holding characteristics that water drawn from the reservoir by the wick like action of the lifting sand will be maintained at every point in the upper surface of the lifting sand in amount not less than said minimum percentage.

7. In a putting green or the like having a non-level surface the combination with a porous root bearing layer of a plurality of water reservoirs located beneath the various surface portions at different levels with provisions for maintaining the water levels in the different reservoirs at different elevations, and lifting sand interposed between each reservoir and the superimposed surface portion and adapted, through its wick like action, to carry water to the root bearing layer from the various reservoirs.

8. In a putting green or the like the combination with a porous root bearing layer of a water reservoir located below said layer and a body of lifting sand interposed between said reservoir and said layer, and adapted to carry water to said layer from said reservoir by its wick-like action, and drainage columns located at intervals in said lifting sand.

9. In a putting green or the like the combination with a porous root bearing layer of a water reservoir located below said layer and a body of lifting sand interposed between said reservoir and said layer, and adapted to carry water to said layer from said reservoir by its wick-like action, and drainage columns located at intervals in said lifting column, and provided with lateral branches at their upper ends.

10. In a putting green or the like the combination with a porous root bearing layer of a water reservoir located below said layer and a body of lifting sand interposed between said reservoir and said layer, and adapted to carry water to said layer from said reservoir by its wick-like action, and drainage columns located at intervals in said lifting sand, and composed of a coarse granular material.

11. In a putting green or the like the combination with a porous root bearing layer of a water reservoir located below said layer and a body of lifting sand interposed between said reservoir and said layer, and adapted to carry water to said layer from said reservoir by its wick-like action and drainage columns located at intervals in said lifting sand and composed of a coarse granular material, and provided with lateral branches at their upper ends.

12. In a putting green or the like the combination with the root bearing layer of a water reservoir located beneath the root bearing layer and having water containing chambers, projecting up from the bottom wall of the reservoir proper, and formed with outlets into the reservoir proper adjacent the bottom wall thereof, of lifting sand filling the reservoir and extending over said chambers and providing a support for the root bearing layer.

13. In a putting green or the like the combination with the root bearing layer of a reservoir beneath the root bearing layer, provisions for discharging water into the reservoir adjacent the bottom wall thereof, broken rock in said reservoir serving to break up the stream or streams of water supplied to the reservoir, lifting sand interposed between the bottom of the reservoir and the root bearing layer, and means for preventing the lifting sand from being washed down into the broken rock, comprising a filter screen layer placed immediately above the rock and between it and the lifting sand proper.

14. In a putting green or the like having a non-level surface the combination with a porous root-bearing layer of a water reservoir located below said layer and lifting sand interposed between said reservoir and said layer, and adapted to normally lift water from the reservoir to the root-bearing layer and to carry to the reservoir any excess of water accumulating in the root bearing layer, of a drain or drains running to the reservoir from one or more low spots in the surface of the green and adapted to carry surface water accumulating on the green at said low spot or spots, to the reservoir.

FREDERICK W. TAYLOR.

Witnesses:
ARNOLD KATZ,
D. STEWART.